US011340690B2

(12) United States Patent
Matula et al.

(10) Patent No.: US 11,340,690 B2
(45) Date of Patent: May 24, 2022

(54) SYSTEM AND METHOD OF UTILIZING DIFFERENT POWER LEVELS OF AT LEAST ONE PROCESSOR OF AN INFORMATION HANDLING SYSTEM

(71) Applicant: Dell Products L.P., Round Rock, TX (US)

(72) Inventors: Terry Lane Matula, Austin, TX (US); Srinivas Kamepalli, Austin, TX (US); Travis Christian North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 16/750,277

(22) Filed: Jan. 23, 2020

(65) Prior Publication Data
US 2021/0232206 A1    Jul. 29, 2021

(51) Int. Cl.
*G06F 1/3287* (2019.01)
(52) U.S. Cl.
CPC ................ *G06F 1/3287* (2013.01)
(58) Field of Classification Search
CPC .................................................. G06F 1/3287
See application file for complete search history.

(56) References Cited

U.S. PATENT DOCUMENTS

| | | | |
|---|---|---|---|
| 2017/0115725 A1* | 4/2017 | Luo | G06F 1/206 |
| 2018/0284867 A1* | 10/2018 | YangGong | G06F 1/3296 |
| 2018/0321735 A1* | 11/2018 | Luo | G06F 1/206 |
| 2019/0094948 A1* | 3/2019 | Rahal-Arabi | G06F 1/324 |

OTHER PUBLICATIONS

Gough, Corey, Ian Steiner, and Winston Saunders. *Energy efficient servers: blueprints for data center optimization.* Apress, 2015.
Single-Phase Wide $V_{IN}$ Range DC/DC Controller for Intel IMVP-6/IMVP-6.5 CPUs, Linear Technology LTC3816, 2010.
White Paper: Power Management in Intel Architecture Servers, INTEL, Apr. 2009.

(Continued)

*Primary Examiner* — Gary Collins
(74) *Attorney, Agent, or Firm* — Baker Botts L.L.P.

(57) ABSTRACT

In one or more embodiments, one or more systems, methods, and/or processes may: determine a utilization value of a processor; determine that the utilization value is at or is above a threshold utilization value; determine a temperature value of the processor; determine a temperature value of a voltage regulator that provides power to the processor; determine if the temperature value of the processor is below a first threshold value and if the temperature value of the voltage regulator is below a second threshold value; if so: determine first power utilization information that informs the processor that it is utilizing less power than it is currently utilizing and provide the first power utilization information to the processor; and otherwise: determine second power utilization information that informs the processor that it is utilizing more power than it is currently utilizing and provide the second power utilization information to the processor.

19 Claims, 6 Drawing Sheets

(56) References Cited

OTHER PUBLICATIONS

Dual-Core Intel Xcon Processor 5100 Series Datasheet, Reference No. 313355-003, INTEL, Aug. 2007.
Lee, Matthew. "Embedded Controller Usage in Low Power Embedded Designs: An Overview." Intel Corporation, Sep. 2011.
Accardi, Kristen C. et al., "POWERTOP: User's Guide", 2014.
Blevins, Dirk et al., "Designing Systems Without a Suspend Supply." Intel Corporation, Dec. 2008.

* cited by examiner

SYSTEM AND METHOD OF UTILIZING DIFFERENT POWER LEVELS OF AT LEAST ONE PROCESSOR OF AN INFORMATION HANDLING SYSTEM

BACKGROUND

Field of the Disclosure

This disclosure relates generally to information handling systems and more particularly to utilizing different power levels of at least one processor of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine a utilization value of a processor of an information handling system that is being utilized for a workload; may determine that the utilization value is at or is above a threshold utilization value; may determine a temperature value of the processor; may determine a temperature value of a voltage regulator of the information handling system that provides power to the processor; may determine if the temperature value of the processor is below a first threshold value and if the temperature value of the voltage regulator is below a second threshold value; if the temperature value of the processor is below the first threshold value and if the temperature value of the voltage regulator is below the second threshold value: may determine first power utilization information that informs the processor that the processor is utilizing less power than the processor is currently utilizing; and may provide the first power utilization information to the processor; and if the temperature value of the processor is not below the first threshold value or if the temperature value of the voltage regulator is not below the second threshold value: may determine second power utilization information that informs the processor that the processor is utilizing more power than the processor is currently utilizing; and may provide the second power utilization information to the processor.

In one or more embodiments, the one or more systems, methods, and/or processes may further provide the first power utilization information to the voltage regulator, if the temperature of the processor is below the first threshold and if the temperature of the voltage regulator is below the second threshold. For example, providing the first power utilization information to the processor may include the voltage regulator providing the first power utilization information to the processor. In one or more embodiments, the one or more systems, methods, and/or processes may further provide the second power utilization information to the voltage regulator, if the temperature of the processor is not below the first threshold or if the temperature of the voltage regulator is not below the second threshold. For example, providing the second power utilization information to the processor may include the voltage regulator providing the second power utilization information to the processor.

In one or more embodiments, the processor may receive the second power utilization information. For example, the processor may further decrease the current power utilization of the processor. In one or more embodiments, the one or more systems, methods, and/or processes may further determine that a workload utilizes another component of the information handling system. In one or more embodiments, the one or more systems, methods, and/or processes may further determine that the other component requires additional power. In one or more embodiments, the one or more systems, methods, and/or processes may further provide the first power utilization information to the voltage regulator. For example, providing the first power utilization information to the processor may include the voltage regulator providing the first power utilization information to the processor. In one or more embodiments, the first power utilization information may include an IMON offset that is less than a default IMON offset. In one or more embodiments, the second power utilization information may include another IMON offset that is greater than the IMON offset. In one or more embodiments, the second power utilization information may include the other IMON offset that is greater than the default IMON offset.

In one or more embodiments, an embedded controller may be configured to: determine a utilization value of a processor of an information handling system that is being utilized for a workload; determine that the utilization value is at or is above a threshold utilization value; determine a temperature value of the processor of the information handling system; determine a temperature value of a voltage regulator of the information handling system that provides power to the processor; determine if the temperature value of the processor of the information handling system is below a first threshold value and if the temperature value of the voltage regulator is below a second threshold value; if the temperature value of the processor of the information handling system is below the first threshold value and if the temperature value of the voltage regulator is below the second threshold value: determine first power utilization information that informs the processor of the information handling system that the processor is utilizing less power than the processor of the information handling system is currently utilizing; and provide the first power utilization information to the processor of the information handling system; and if the temperature value of the processor of the information handling system is not below the first threshold value or if the temperature value of the voltage regulator is not below the second threshold value: determine second power utilization information that informs the processor of the information handling system that the processor is utilizing more power than the processor of the information handling system is currently utilizing; and provide the second power utilization information to the processor of the information handling system.

In one or more embodiments, to provide the first power utilization information to the voltage regulator, the embedded controller may be further configured to provide the first power utilization information to a bus coupled to the embedded controller and the voltage regulator. In one or more embodiments, to provide the first power utilization information to the voltage regulator, the embedded controller may be further configured to provide the first power utilization information to a bus coupled to the embedded controller and the voltage regulator.

In one or more embodiments, to provide the second power utilization information to the processor of the information handling system, the embedded controller may be further configured to provide the second power utilization information to the voltage regulator. In one or more embodiments, to determine the temperature value of the processor of the information handling system, the embedded controller may be further configured to receive the temperature value of the processor of the information handling system from the processor of the information handling system. In one or more embodiments, to receive the temperature value of the processor of the information handling system from the processor of the information handling system, the embedded controller may be further configured to receive the temperature value of the processor of the information handling system from at least one of a bus and a platform controller hub.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more temperature values of one or more respective components of an information handling system may cause a processor of the information handling system to execute instructions at a lower clock frequency. In one example, the processor may execute instructions at a first clock frequency. In another example, a temperature value of a component may be greater than or equal to a threshold temperature value, and the processor may execute instructions at a second clock frequency, lower than the first clock frequency. In one or more embodiments, a temperature value of a component may be a temperature value of a semiconductor of a semiconductor package. For example, a threshold temperature value may be a maximum temperature value of the semiconductor of the semiconductor package. For instance, the threshold temperature value may be obtained and/or received from a manufacturer of the semiconductor package and/or from a vendor of the semiconductor package. In one or more embodiments, a temperature value may be associated with a temperature in degrees Celsius, degrees Kelvin, or degrees Fahrenheit, among others.

In one or more embodiments, information that indicates a level of current for an output voltage of a voltage regulator, which provides power to the processor, may be called an IMON signal. For example, an IMON signal may include an IMON offset. For instance, an IMON signal may be provided to the processor. In one or more embodiments, one or more systems, one or more methods, and/or one or more processes may dynamically adjust IMON offset reporting based at least on a processor temperature value and a processor utilization value, among others. For example, one or more systems, one or more methods, and/or one or more processes may permit dynamic tuning of IMON offset reporting based at least on one or more of a temperature value of a processor of an information handling system, utilization of the processor, and a workload, among others.

In one or more embodiments, a default IMON offset may be based at least on a workload utilization history and/or an application utilization history. For example, the workload utilization history and/or the application utilization history may be stored via a data structure. For instance, the data structure may include one or more of a database, a lookup table, and an array, among others. In one or more embodiments, a workload may include instructions executable by the processor. For example, the workload may include one or more applications that may be executable by the processor. For instance, the workload may include one or more of an image processing application (e.g., PHOTOSHOP®, GIMP, Illustrator, CorelDRAW, Inkscape, Acorn, Pixelmator, Paint.NET, Serif PhotoPlus, etc.), a video processing application (e.g., Adobe Premier, Adobe Premier Pro, Final Cut, Final Cut Pro, SONY® Movie Studio, MAGIX Movie Edit Pro Plus, Manga Studio, Corel Videostudio Ultimate, etc.), an audio processing application (e.g., Ableton Live, FL Studio, APPLE® Logic Pro X, Audacity, Avid Pro Tools, Acid Pro, APPLE® Garageband, etc.), a computer aided design (CAD) application (e.g., AUTOCAD®, TurboCAD, Visio, DRAFTSIGHT®, FreeCAD, Solidworks, ORCAD®, Osmond PCB, BSch3V, Kicad, etc.), an artificial intelligence (AI) application, a word processing application, (e.g., MICROSOFT® Word, APPLE® Pages, Apache OpenOffice, WordPerfect, AbiWord, etc.), and a spreadsheet application (e.g., MICROSOFT® Excel, APPLE® Numbers, Smartsheet, Apache OpenOffice Calc, Zoho Sheet, etc.), among others.

In one or more embodiments, one or more systems, one or more methods, and/or one or more processes may take advantage of thermal headroom of the processor. For example, by taking advantage of the thermal headroom of the processor, performance of the processor may be increased. In one instance, the processor may utilize the first clock frequency for a longer period of time before utilizing the second clock frequency. In another instance, the processor may utilize the first clock frequency without utilizing the second clock frequency. In one or more embodiments, when the processor utilizes the first clock frequency, more information may be processed in a period of time. For example, the processor may process more information in the time period if the processor utilizes the first clock frequency than if the processor utilizes the second clock frequency.

In one or more embodiments, one or more systems, one or more methods, and/or one or more processes may utilize one or more temperature values of the processor and one or more processes may utilize one or more temperature values of a voltage regulator that provides power to the processor. In one example, an on-die digital thermal sensor (DTS) may determine the one or more temperature values (e.g., digital values) of the processor. In another example, an on-die DTS may determine the one or more temperature values (e.g., digital values) of the voltage regulator that provides power to the processor.

In one or more embodiments, processor utilization value may be determined. For example, the processor utilization value may be determined based at least on a workload utilization. In one or more embodiments, if processor utilization value is at or above a processor utilization threshold value, an IMON offset control value may be determined based at least on one or more of a temperature value of the processor and a temperature value of the voltage regulator that provides power to the processor, among others.

In one or more embodiments, the one or more temperature values of the processor and the one or more temperature values of the voltage regulator that provides power to the processor may be utilized in determining an IMON offset control value. In one example, if a temperature value of the processor is below a first threshold value and if a temperature value of the voltage regulator is below a second threshold value, an IMON offset may be decreased. For instance, the IMON offset may be decreased by five percent (5%). If the IMON offset is decreased, performance of the processor may be increased. In another example, if the temperature value of the process is not below the first threshold value or if the temperature value of the voltage regulator is not below the second threshold value, the IMON offset may be increased. For instance, the IMON offset may be increased by five percent (5%). If the IMON offset is increased, performance of the processor may be decreased.

In one or more embodiments, the processor performance may be intentionally decreased. For example, intentionally decreasing the processor performance may include intentionally reducing power consumption of the processor. For instance, reducing the power consumption of the processor may not impact power limits of the information handling system. In one or more embodiments, one or more determinations of one or more utilization values may be based at least on one or more application utilization values and/or one or more workload utilization values. For example, the one or more utilization values may be utilized in determining one or more IMON offset values. In one or more embodiments, the one or more utilization values may be associated with processing power that one or more applications and/or one or more workloads are utilizing. For example, a process status command of an operating system may be utilized in determining the one or more utilization values. For instance, the process status command of the operating system may determine the one or more utilization values and/or provide the one or more utilization values.

In one or more embodiments, a processor of an information handling system may receive information that may be utilized to determine power utilization of the processor. For example, the processor may receive the information that may be utilized to determine the power utilization of the processor from a component of the information handling system. For instance, the component may provide, to the processor, the information that may be utilized to determine the power utilization of the processor. In one or more embodiments, the component may include a voltage regulator.

In one or more embodiments, first information that may be utilized by the processor to determine first power utilization of the processor may be accurate. For example, the first information that may be utilized to determine the power utilization of the processor may be accurate within a tolerance. In one or more embodiments, second information that may be utilized by the processor to determine second power utilization of the processor may not be accurate. For example, the second information may cause the processor to determine the second power utilization of the processor that is less power than power that the processor is actually utilizing. For instance, the processor may utilize the second information to determine that the processor is utilizing the second power, while the processor is actually utilizing the first power, which is greater than the second power.

In one or more embodiments, if the processor determines the first power, the processor may utilize a first clock frequency. For example, if the processor determines the second power, the processor may utilize a second clock frequency, greater than the first clock frequency. For instance, if the processor utilizes the second clock frequency, the processor may perform better than the processor would if the processor utilizes the first clock frequency. In one or more embodiments, if a temperature value increased, the processor may receive the first information. In one example, the component of the information handling system may provide the first information to the processor if a temperature value increased and/or if a temperature value is determined to have increased. In another example, the component of the information handling system may provide third information to the processor if a temperature value increased and/or if a temperature value is determined to have increased. In one or more embodiments, the third information may not be accurate. For example, the processor may utilize a third power utilization based at least on the third information. For instance, the processor may determine, based at least on the third information, that the processor is utilizing more power than the processor is actually utilizing.

In one or more embodiments, by providing the third information to the processor, power may be utilized by other components of the information handling system and/or components coupled to the information handling system. For example, the processor may include a central processor unit (CPU). For instance, by providing the third information to the CPU, power which is no longer utilized by the CPU may be utilized by one or more graphics processor units (GPUs) of the information handling system. In one or more embodiments, a workload may include utilization of the one or more GPUs. For example, the workload may include more utilization of the one or more GPUs than utilization of the CPU.

Figure 1A:
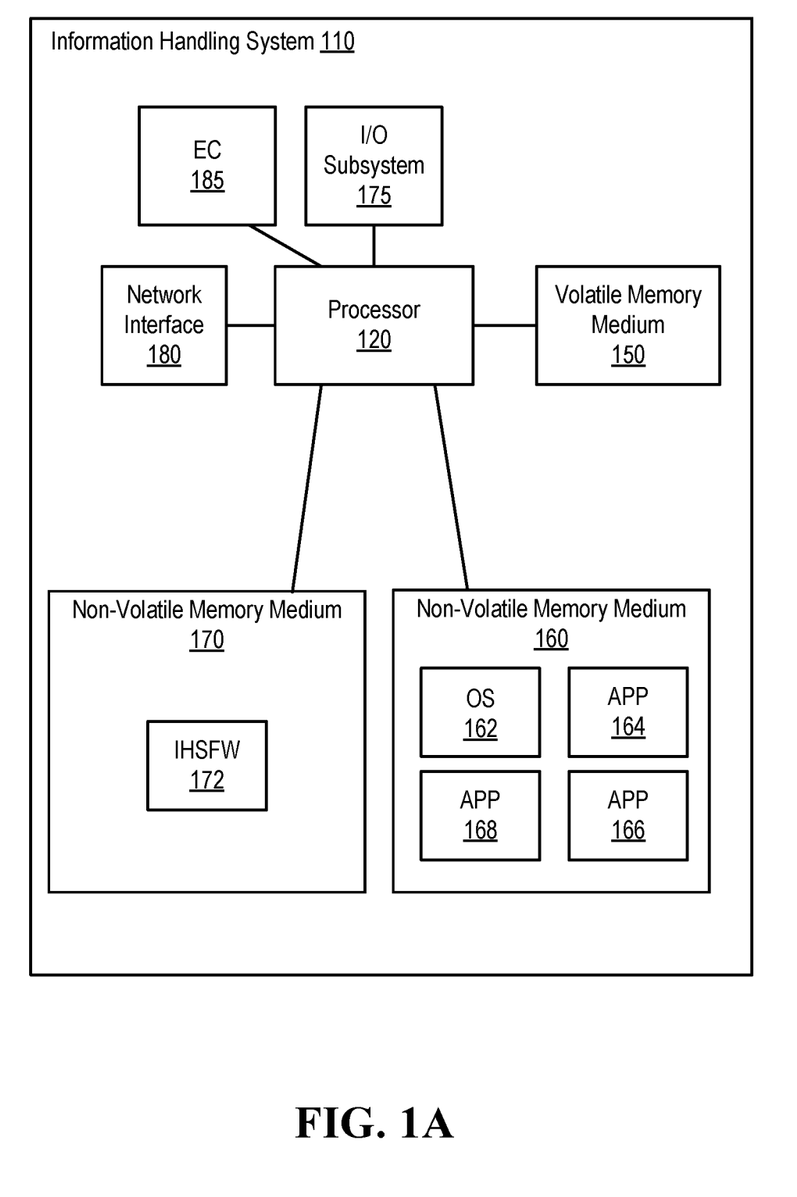
FIG. 1A illustrates an example of an information handling system, according to one or more embodiments.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a workstation computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, Hyper-Transport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and an embedded controller (EC) 185. As illustrated, volatile memory medium 150, non-volatile memory media 160 and 170, I/O subsystem 175, network interface 180, EC 185 may be communicatively coupled to processor 120.

In one or more embodiments, one or more of volatile memory medium 150, non-volatile memory media 160 and 170, I/O subsystem 175, network interface 180, and EC 185 may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, and EC 185 may be communicatively coupled to processor 120 via one or more PCI-Express (PCIe) root complexes. In another example, one or more of an PO subsystem 175, network interface 180, and EC 185 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, EC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 185 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 185 may be or include an application processor. In one example, EC 185 may be or include an ARM Cortex-A processor. In another example, EC 185 may be or include an Intel Atom processor. In one or more embodiments, EC 185 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

Figure 1B:
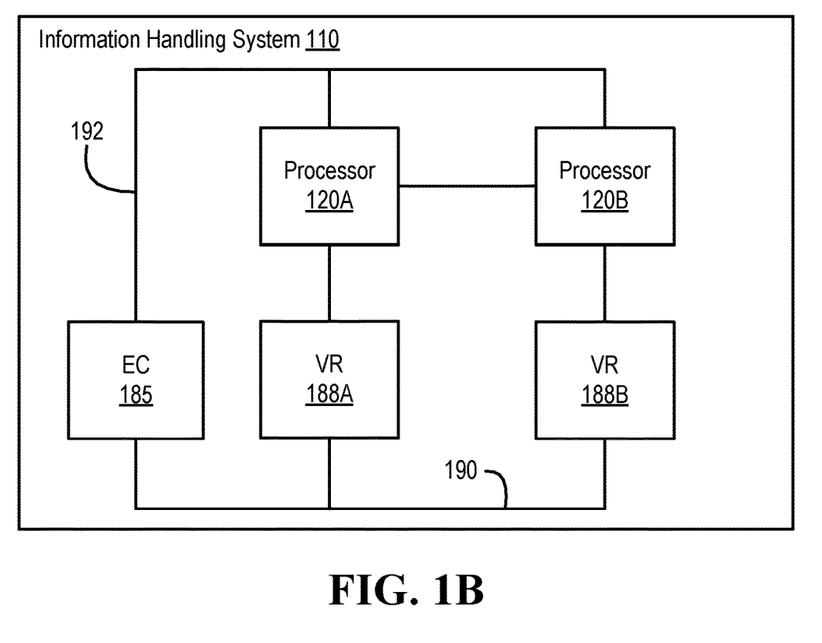
FIG. 1B illustrates a second example of an information handling system, according to one or more embodiments.

Turning now to FIG. 1B, a second example of an information handling system is illustrated, according to one or more embodiments. As shown, IHS 110 may include processors 120A and 120B. As illustrated, processors 120A and 120B may be coupled to each other. As shown, IHS 110 may include voltage regulators (VRs) 188A and 188B. For example, a voltage regulator (VR) 188 may be configured to provide power (e.g., current at a voltage) to a processor 120. In one instance, VR 188A may provide power to processor 120A. In another instance, VR 188B may provide power to processor 120B. In one or more embodiments, a VR 188 may include a voltage regulator module (VRM).

In one or more embodiments, a processor 120 may communicate a supply voltage to a VR 188 via a bus. For example, the bus may include a serial bus. For instance, the bus may include an I²C bus. In one or more embodiments, the bus may include a serial voltage identification (SVID) bus. In one or more embodiments, a processor 120 may communicate a supply voltage to a VR 188 via a number of bits. For example, the number of bits may be referred to as a voltage identification (VID). For instance, when VR 188 receives a VID that identifies a supply voltage, VR 188 may provide the supply voltage to processor 120. In one or more embodiments, VR 188 may provide multiple supply voltages (e.g., multiple voltages). For example, each of the multiple supply voltages may be associated with a corresponding VID. For instance, a VR 188 that utilizes a five-bit VID may produce up to thirty-two ($2^5$) distinct output voltages.

In one or more embodiments, a VR 188 may provide information to a processor 120. For example, the information may indicate a level of current for an output voltage of VR 188. For instance, the information that indicates the level of current for the output voltage of VR 188 may be called an IMON signal. In one or more embodiments, the information that indicates the level of current for the output voltage of VR 188 may be accurate. In one or more embodiments, the information that indicates the level of current for the output voltage of VR 188 not may be accurate. For example, VR 188 may provide the information to processor 120 such that processor 120 will respond to the information. In one instance, the information may indicate, to processor 120, that processor 120 is receiving a level of current for an output voltage of VR 188 higher than a level of current for the output voltage that is actually being provided to processor 120. In another instance, the information may indicate, to processor 120, that processor 120 is receiving a level of current for an output voltage of VR 188 lower than a level of current for the output voltage that is actually being provided to processor 120.

As illustrated, VRs 188A and 188B may be coupled to EC 185. In one or more embodiments, VRs 188A and 188B may be coupled to EC 185 via a bus 190. For example, bus 190 may include a serial bus. For instance, the serial bus may include an I²C bus. As shown, EC 185 may be coupled to processors 120A and 120B. In one or more embodiments, EC 185 may be coupled to processors 120A and 120B a bus 192. For example, bus 192 may include a platform environment control interface (PECI) bus. In one instance, EC 185 may receive one or more temperature values of processor 120A via bus 192. In another instance, EC 185 may receive one or more temperature values of processor 120B via bus 192.

In one or more embodiments, a processor 120 may include one or more on-die digital thermal sensors (DTSs). For example, an on-die DTS may determine a temperature value of at least a portion of a processor 120. For instance, an on-die DTS may provide a determined temperature value of at least a portion of a processor 120 to EC 185 via bus 192. In one or more embodiments, bus 192 may include a serial bus. In one or more embodiments, bus 192 may be associated with variable data transfer speeds. In one or more embodiments, bus 192 may include a single-wire interface. For example, the single-wire interface may be associated with variable data transfer speeds. In one or more embodiments, an on-die DTS may provide a negative temperature value that expresses a difference between a current temperature value and a thermal throttle value (e.g., a point at which a processor 120 may reduce speed or may shut down to prevent damage due to overheating) instead of an absolute temperature value.

Figure 1C:
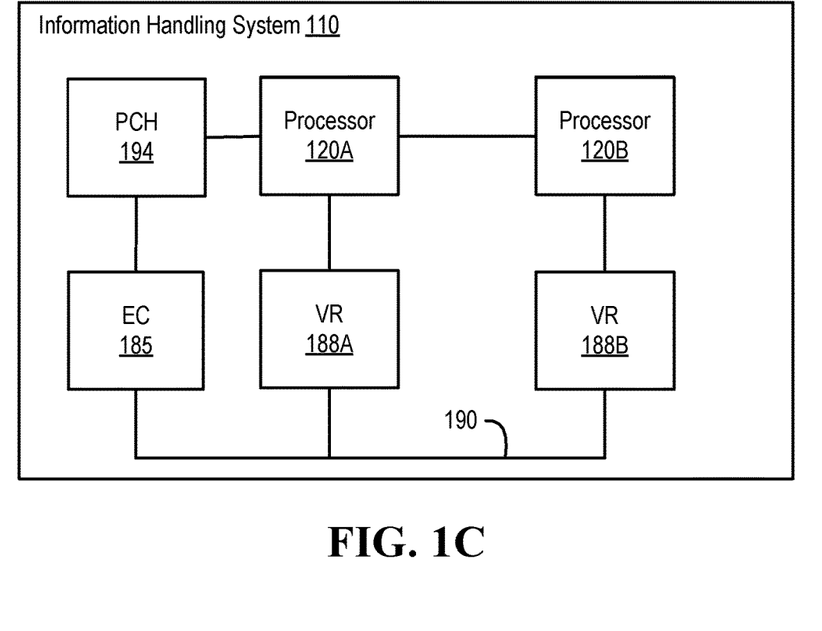
FIG. 1C illustrates another example of an information handling system, according to one or more embodiments.

Turning now to FIG. 1C, another example of an information handling system is illustrated, according to one or more embodiments. As shown, IHS 110 may include a platform controller hub (PCH) 194. As illustrated, PCH 194 may be coupled to processor 120A. As shown, PCH 194 may be coupled to EC 185. In one or more embodiments, EC 185 may receive temperature values from one or more on-die DTSs from one or more of processors 120A and 120B via PCH 194.

Figure 2:
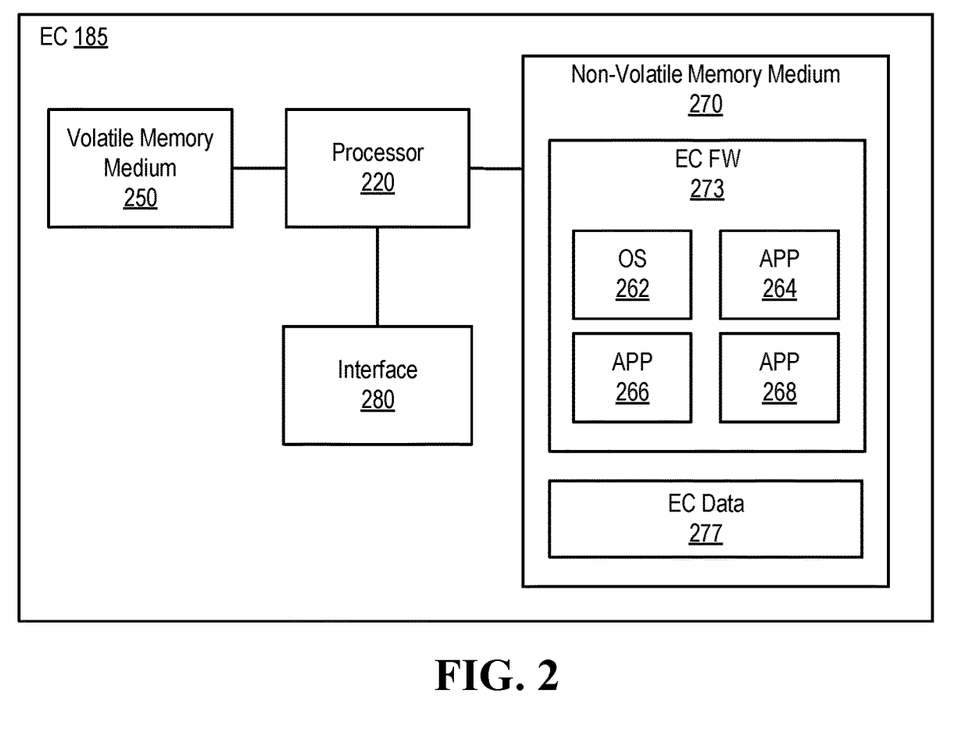
FIG. 2 illustrates an example of an embedded controller, according to one or more embodiments.

Turning now to FIG. 2, an example of an embedded controller is illustrated, according to one or more embodiments. As shown, EC 185 may include a processor 220, a volatile memory medium 250, a non-volatile memory medium 270, and an interface 280. As illustrated, non-volatile memory medium 270 may include an EC firmware (FW) 273, which may include an OS 262 and APPs 264-268, and may include EC data 277. In one example, OS 262 may be or include a real-time operating system (RTOS). In a second example, OS 262 may be or include an Unix-like operating system. For instance, the Unix-like operating system may be or include Linux, FreeBSD, NetBSD, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 185 to provide and/or receive signals associated with other circuitry and/or other one or more devices. In a third example, interface 280 may include circuitry that enables communicatively coupling to one or more networks. In one instance, interface 280 may include circuitry that enables communicatively coupling to network interface 180. In a fourth example, interface 280 may include circuitry that enables communicatively coupling to bus 190. In a fifth example, interface 280 may include circuitry that enables communicatively coupling to bus 192. In a sixth example, interface 280 may include circuitry that enables communicatively coupling to PCH 194. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250.

In one or more embodiments, processor 220 may execute instructions in accordance with at least a portion of one or more systems, one or more flowcharts, one or more methods, and/or one or more processes described herein. For example, non-volatile memory medium 270 and/or volatile memory medium 250 may store instructions that may be executable in accordance with at least a portion of one or more systems, flowcharts, one or more methods, and/or one or more processes described herein. In one or more embodiments, processor 220 may execute instructions in accordance with at least a portion of one or more of systems, flowcharts, methods, and/or processes described herein. For example, non-volatile memory medium 270 and/or volatile memory medium 250 may store instructions that may be executable in accordance with at least a portion of one or more of systems, flowcharts, methods, and/or processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3A:
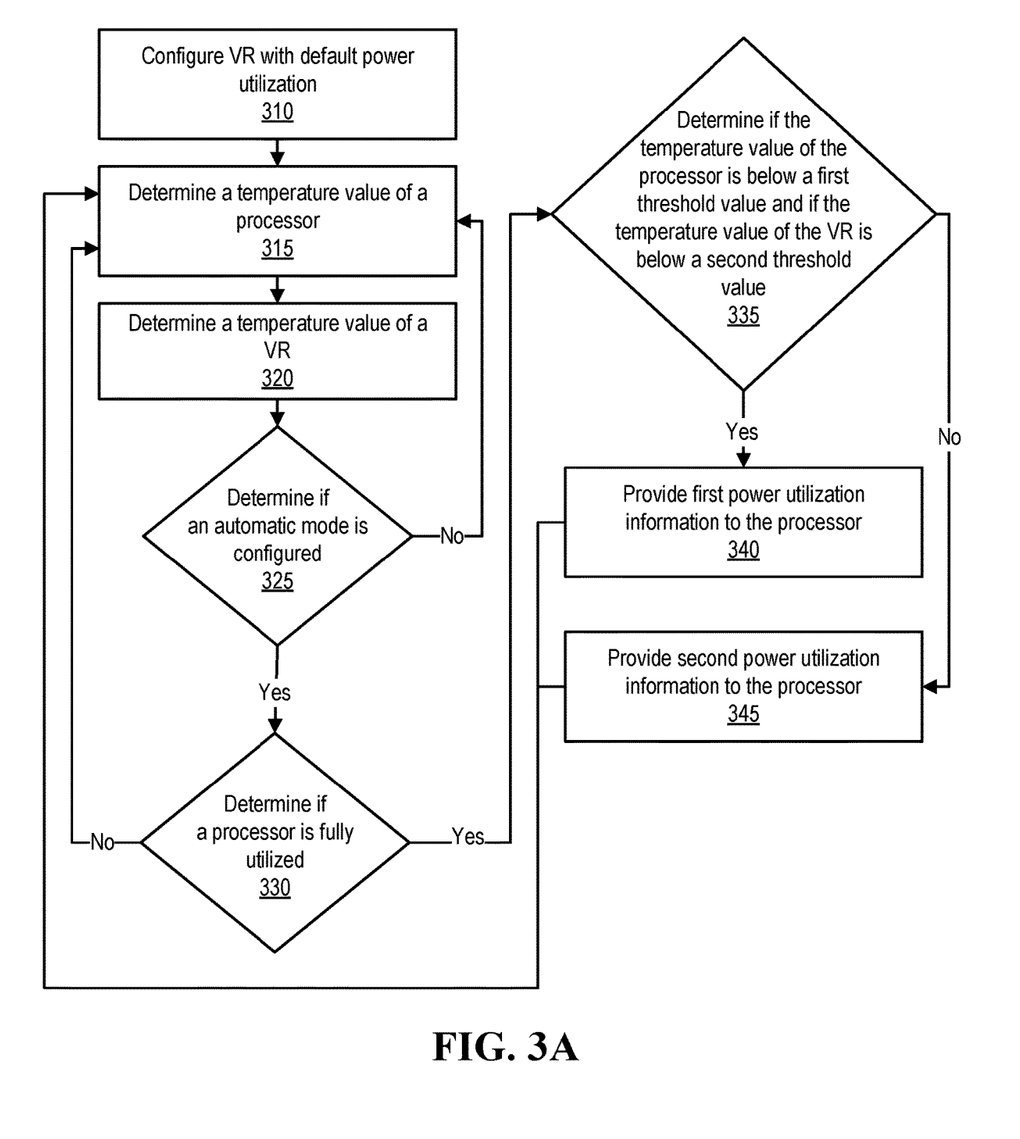
FIG. 3A illustrates an example of a method of operating an information handling system, according to one or more embodiments.

Turning now to FIG. 3A, an example of a method of operating an information handling system is illustrated, according to one or more embodiments. At 310, a VR may be configured with default power utilization information. In one example, a VR 188 may configure itself with default power utilization information. In another example, EC 185 may configure a VR 188 with default power utilization information. In one or more embodiments, the default power utilization information may include a default IMON offset. In one example, a VR 188 may configure itself with a default IMON offset. In another example, EC 185 may configure a VR 188 with a default IMON offset.

At 315, a temperature value of a processor may be determined. For example, a temperature value of processor 120 may be determined. In one or more embodiments, determining a temperature of a processor may include receiving data that indicates the temperature of the processor. In one or more embodiments, the temperature value of the processor may be a difference between a current temperature value of the processor and a maximum temperature value of the processor. In one example, if the processor has maximal temperature value of 90° C. and a current temperature value of 35° C., a temperature value determined may be −55° C. In another example, if the processor has maximal temperature value of 90° C. and a current temperature value of 35° C., a temperature value determined may be 55° C. In one or more embodiments, the temperature value of the processor may indicate thermal headroom of the processor.

At 320, a temperature value of a VR may be determined. For example, a temperature of VR 188 may be determined. In one or more embodiments, determining a temperature of a VR may include receiving data that indicates the temperature value of the VR. At 325, it may be determined if an automatic mode is configured. For example, determining if an automatic mode is configured may include accessing a memory medium and determining if a stored value from the memory medium indicates if an automatic mode is configured. In one or more embodiments, IHSFW 172 may store a flag that indicated if an automatic mode is configured. In one or more embodiments, the automatic mode may indicate if providing alternate or false power information to processor 120 to control utilization of processor 120 is permitted.

If the automatic mode is not configured, the method may proceed to 315, according to one or more embodiments. If the automatic mode is configured, it may be determined if a processor utilization value of the processor is greater than or equal to a threshold processor utilization value, at 330. For example, an OS may determine a utilization value of the processor. For instance, OS 162 may determine a processor utilization value of processor 120. In one or more embodiments, EC 185 may receive a processor utilization value of processor 120 from OS 162. For example, EC 185 may receive a processor utilization value of processor 120 from OS 162 via a management information exchange. In one instance, EC 185 may receive a processor utilization value of processor 120 from OS 162 via WMI. In another instance, EC 185 may receive a processor utilization value of processor 120 from OS 162 via CIM. In one or more embodiments, a processor utilization value of processor 120 may be determined by an application type and/or an application identification (e.g., an application name, a process identification, etc.). In one or more embodiments, a processor utilization value of processor 120 may be determined by a workload type and/or a workload name. For example, a workload may include one or more applications. For instance, the one or more applications of the workload may process data of or associated with the workload.

If the processor is not fully utilized, the method may proceed to 315, according to one or more embodiments. If the processor is fully utilized, it may be determined if the temperature value of the processor is below a first threshold value and if the temperature value of the VR is below a second threshold value, at 335. In one example, the first threshold may be a temperature below a maximum temperature that the processor is rated. For instance, the first threshold value may represent a temperature that is five percent (5%) below a maximum temperature that the processor is rated. In another example, the first threshold value may represent a temperature below a maximum temperature that the VR is rated. For instance, the first threshold value may represent a temperature that is five percent (5%) below the maximum temperature that the VR is rated.

If the temperature value of the processor is below the first threshold value and if the temperature value of the VR is below the second threshold value, first power utilization information may be provided to the processor, at 340. In one example, VR 188 may provide the first power utilization information to processor 120. In another example, EC 185 may provide the first power utilization information to VR 188. For instance, EC 185 may provide the first power utilization information to VR 188, VR 188 may receive the first power utilization information, and VR 188 may provide the first power utilization information to processor 120.

In one or more embodiments, the first power utilization information may indicate a lower power utilization by a percentage. For example, the percentage may indicate an under utilization by the percentage. For instance, the first power utilization information may indicate a lower power utilization by five percent (5%). In one or more embodiments, if the temperature value of the processor is below the first threshold value and if the temperature value of the VR is below the second threshold value, an IMON offset may be lowered. For example, the IMON offset may be lowered by five percent (5%). In one or more embodiments, the first power utilization information may include the IMON offset. For example, the first power utilization information may include the IMON offset that was lowered. For instance, the first power utilization information may include the IMON offset that was lowered by five percent (5%). In one or more embodiments, the method may proceed to 315. In one or more embodiments, providing the first power utilization information to the processor may limit a performance drop of the processor due to processor throttling.

If the temperature value of the processor is not below the first threshold value or if the temperature value of the VR is not below the second threshold value, second power utilization information may be provided to the processor, at 345. In one example, VR 188 may provide the second power utilization information to processor 120. In another example, EC 185 may provide the second power utilization information to VR 188. For instance, EC 185 may provide the second power utilization information to VR 188, and VR 188 may provide the second power utilization information to processor 120.

In one or more embodiments, the second power utilization information may indicate a higher power utilization by a percentage. For example, the percentage may indicate an over utilization by the percentage. For instance, the second power utilization information may indicate a higher power utilization by five percent (5%). In one or more embodiments, if the temperature value of the processor is not below the first threshold value or if the temperature value of the VR is not below the second threshold value, second power utilization information may be provided to the processor, the IMON offset may be raised. For example, the IMON offset may be raised by five percent (5%). For instance, raising the IMON offset may indicate to the processor that it is utilizing more power that it is actually utilizing. In one or more embodiments, the second power utilization information may include the IMON offset. For example, the second power utilization information may include the IMON offset that was raised. For instance, the second power utilization information may include the IMON offset that was raised by five percent (5%). In one or more embodiments, the method may proceed to 315.

Figure 3B:
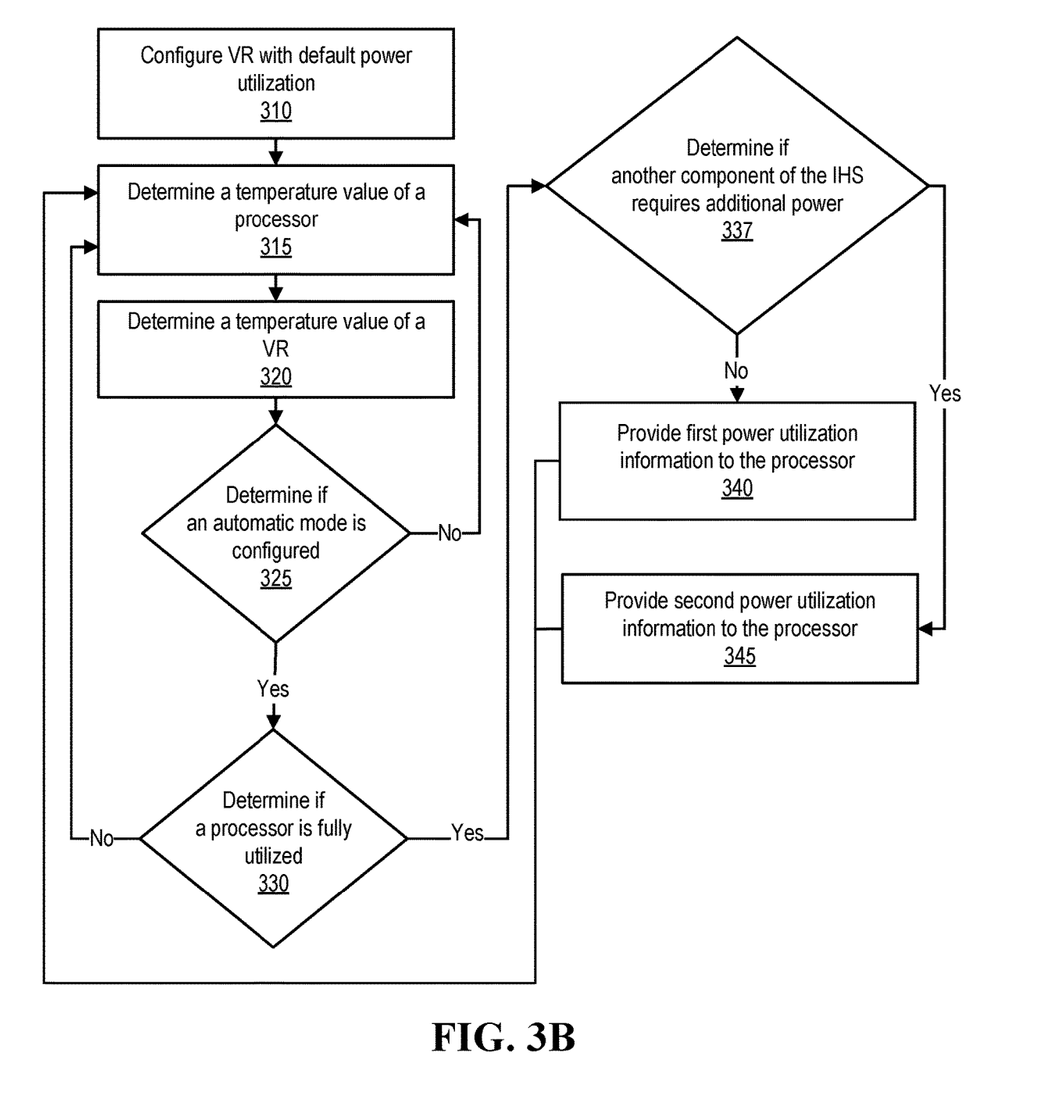
FIG. 3B illustrates a second example of a method of operating an information handling system, according to one or more embodiments.

Turning now to FIG. 3B, a second example of a method of operating an information handling system is illustrated, according to one or more embodiments. In one or more embodiments, method elements 310-325, 340, and 345 may be performed as described with reference to FIG. 3A. At 330, it may be determined if a processor utilization value of the processor is greater than or equal to a threshold processor utilization value. If the processor is not fully utilized, the method may proceed to 315, according to one or more embodiments. If the processor is fully utilized, it may be determined if another component of the information handling system requires additional power, at 337. For example, another component of IHS 110 may include volatile memory medium 150, non-volatile memory medium 160, non-volatile memory medium 170, I/O subsystem 175, network interface 180, a graphics processor unit (GPU) of IHS 110, or a graphics card of IHS 110, among others.

If the other component of the information handling system does not require additional power, the method may proceed to 340, according to one or more embodiments. If the other component of the information handling system requires additional power, the method may proceed to 345, according to one or more embodiments. In one or more embodiments, a requirement for additional power may not be a specific need. For example, the requirement for additional power may be an ability to utilize the additional power. For instance, providing the additional power to the other component may permit processing of a workload to be performed faster than if the additional power was not provided to the other component. In this fashion, power can be redistributed from the processor to at least one other component of the information handling system to process the workload faster than if the power was not redistributed from the processor to the at least one other component.

Figure 4:
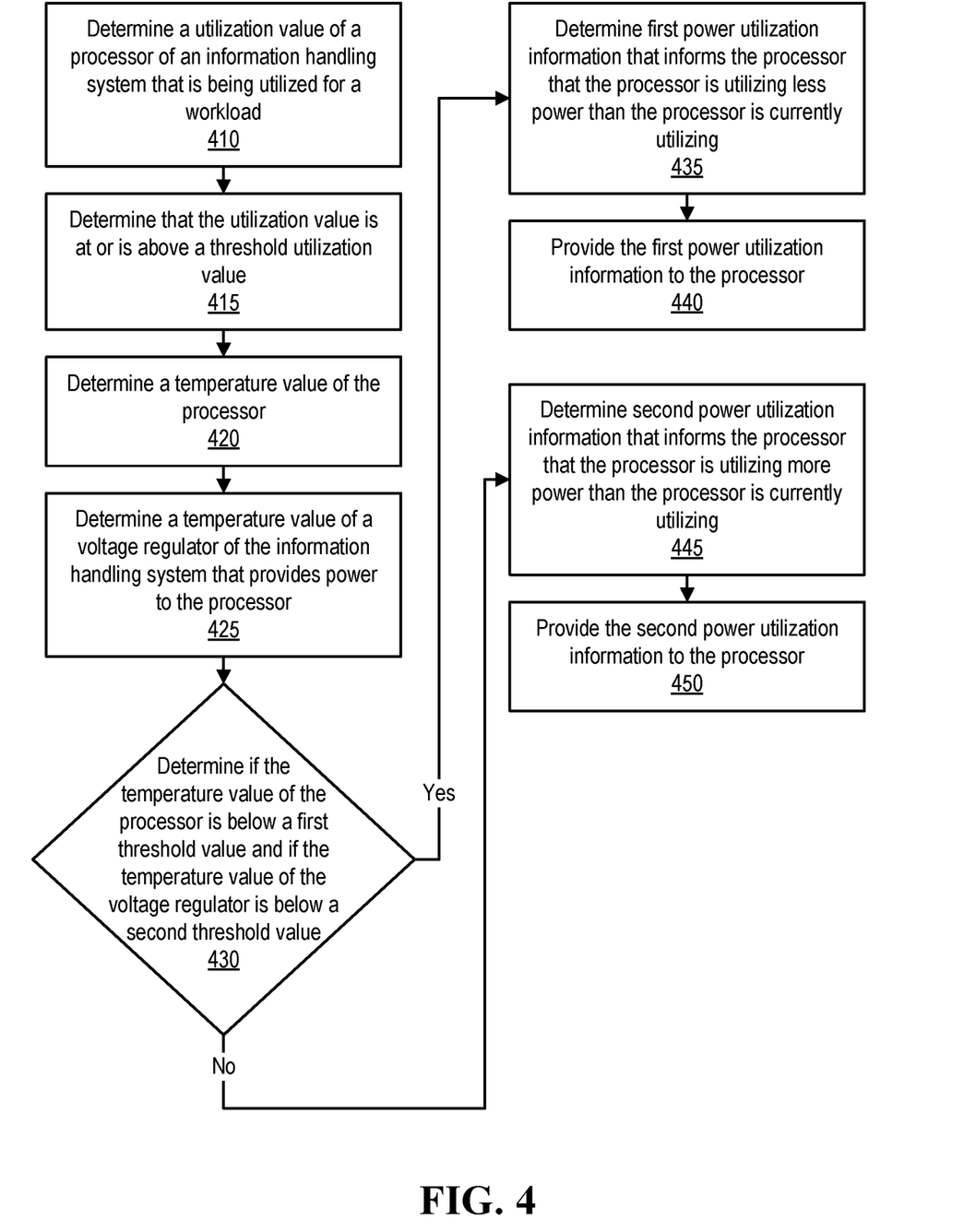
FIG. 4 illustrates another example of a method of operating an information handling system, according to one or more embodiments.

Turning now to FIG. 4, another example of a method of operating an information handling system is illustrated, according to one or more embodiments. At 410, a utilization value of a processor of an information handling system that is being utilized for a workload may be determined. For example, an OS may determine a utilization value of the processor. For instance, OS 162 may determine a processor utilization value of processor 120. In one or more embodiments, EC 185 may receive a processor utilization value of processor 120 from OS 162. For example, EC 185 may receive a processor utilization value of processor 120 from OS 162 via a management information exchange. In one instance, EC 185 may receive a processor utilization value of processor 120 from OS 162 via WMI. In another instance, EC 185 may receive a processor utilization value of processor 120 from OS 162 via CIM. In one or more embodiments, a processor utilization value of processor 120 may be determined by an application type and/or an application identification (e.g., an application name, a process identification, etc.). In one or more embodiments, a processor utilization value of processor 120 may be determined by a workload type and/or a workload name. For example, a workload may include one or more applications. In one or more embodiments, utilizing a processor of an information handling system for a workload may include the processor executing processor instructions to process data of or associated with the workload. For example, one or more applications may include the processor instructions.

At 415, it may be determined that the utilization value is at or is above a threshold utilization value. For example, EC 185 may determine that the utilization value is at or is above the threshold utilization value. At 420, a temperature value of the processor may be determined. For example, EC 185 may determine a temperature value of processor 120. For instance, determining the temperature value of processor 120 may include receiving the temperature value of processor 120. In one or more embodiments, EC 185 may receive the temperature value of processor 120 via a bus. In one or more embodiments, EC 185 may receive the temperature value of processor 120 via a platform controller hub. In one or more embodiments, an on-die DTS may determine a temperature value of at least a portion of processor 120. In one example, an on-die DTS may provide a determined temperature value of the at least the portion of processor 120 to EC 185 via bus 192. In another example, an on-die DTS may provide a determined temperature value of the at least the portion of processor 120 to EC 185 via PCH 194. In one or more embodiments, processor 120 may include the on-die DTS. For example, processor 120 may include the on-die DTS on a die of processor 120.

At 425, a temperature value of a voltage regulator of the information handling system that provides power to the processor may be determined. For example, EC 185 may determine a temperature value of VR 188 that provides power to processor 120. For instance, determining the temperature value of VR 188 may include receiving the temperature value of VR 188. In one or more embodiments, EC 185 may receive the temperature value of VR 188 via a bus. In one or more embodiments, an on-die DTS may determine a temperature value of at least a portion of VR 188. For example, an on-die DTS may provide a determined temperature value of the at least the portion of VR 188 to EC 185 via bus 190. In one or more embodiments, VR 188 may include the on-die DTS. For example, VR 188 may include the on-die DTS on a die of VR 188.

At 430, it may be determined if the temperature value of the processor is below a first threshold value and if the temperature value of the voltage regulator is below a second threshold value. For example, EC 185 may determine if a temperature value of processor 120 is below a first threshold value and if a temperature value of VR 188 is below a second threshold value.

If the temperature value of the processor is below the first threshold value and if the temperature value of the voltage regulator is below the second threshold value, first power utilization information that informs the processor that the processor is utilizing less power than the processor is currently utilizing may be determined, at 435. For example, EC 185 may determine first power utilization information that informs processor 120 that processor 120 is utilizing less power than processor 120 is currently utilizing. In one or more embodiments, the first power utilization information may include an IMON offset that is less than a default IMON offset. In one or more embodiments, the first power utilization information may include an IMON offset that is less than a current IMON offset.

At 440, the first power utilization information may be provided to the processor. For example, EC 185 may provide the first power utilization information to processor 120. In one or more embodiments, providing the first power utilization information to the processor may include VR 188 providing the first power utilization information to processor 120. For example, EC 185 may provide the first power utilization information to VR 188. In one instance, VR 188 may receive the first power utilization information from EC 185. In another instance, VR 188 may provide the first power utilization information to processor 120.

In one or more embodiments, the processor may receive the first power utilization information. For example, processor 120 may receive the first power utilization information from VR 188. In one or more embodiments, the processor may decrease the current power utilization (e.g., the present power utilization) of the processor. For example, processor 120 may decrease the current power utilization of processor 120. For instance, processor 120 may increase, based at least on the first power utilization information, the current power utilization of processor 120. In one or more embodiments, processor 120 may increase the current power utilization of processor 120 in response to receiving the first power utilization information.

If the temperature value of the processor is not below the first threshold value or if the temperature value of the voltage regulator is not below the second threshold value, second power utilization information that informs the processor that the processor is utilizing more power than the processor is currently utilizing may be determined, at 445. For example, EC 185 may determine second power utilization information that informs processor 120 that processor 120 is utilizing more power than processor 120 is currently utilizing. In one or more embodiments, the second power utilization information may include an IMON offset that is greater than a default IMON offset. In one or more embodiments, the second power utilization information may include an IMON offset that is greater than a current IMON offset.

At 450, the second power utilization information may be provided to the processor. For example, EC 185 may provide the second power utilization information to processor 120. In one or more embodiments, providing the second power utilization information to the processor may include VR 188 providing the second power utilization information to processor 120. For example, EC 185 may provide the second power utilization information to VR 188. In one instance, VR 188 may receive the second power utilization information from EC 185. In another instance, VR 188 may provide the second power utilization information to processor 120.

In one or more embodiments, the processor may receive the second power utilization information. For example, processor 120 may receive the second power utilization information from VR 188. In one or more embodiments, the processor may decrease the current power utilization of the processor. For example, processor 120 may decrease the current power utilization of processor 120. For instance, processor 120 may decrease, based at least on the second power utilization information, the current power utilization of processor 120. In one or more embodiments, processor 120 may decrease the current power utilization of processor 120 in response to receiving the second power utilization information.

In one or more embodiments, it may be determined that a workload utilizes another component of the information handling system. For example, it may be determined that the other component requires additional power. In one or more embodiments, the second power utilization information may be provided to the processor based at least on determining that a workload utilizes another component of the information handling system. For example, the second power utilization information may be provided to the processor in response to determining that a workload utilizes another component of the information handling system.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
an embedded controller coupled to the at least one processor;
at least one voltage regulator, coupled to the at least one processor and coupled to the embedded controller, configured to provide power to the at least one processor;
wherein the embedded controller is configured to:
determine a utilization value of the at least one processor that is being utilized for a workload;
determine that the utilization value is at or is above a threshold utilization value;
determine a temperature value of the processor;
determine a temperature value of the at least one voltage regulator;
determine if the temperature value of the processor is below a first threshold value and if the temperature value of the at least one voltage regulator is below a second threshold value;
if the temperature value of the processor is below the first threshold value and if the temperature value of the at least one voltage regulator is below the second threshold value:
determine first power utilization information that informs the processor that the processor is utilizing less power than the processor is currently utilizing; and
provide the first power utilization information to the processor; and
if the temperature value of the processor is not below the first threshold value or if the temperature value of the at least one voltage regulator is not below the second threshold value:
determine second power utilization information that informs the processor that the processor is utilizing more power than the processor is currently utilizing; and
provide the second power utilization information to the processor; and
wherein the at least one processor is configured to:
receive the second power utilization information; and
decrease the current power utilization of the processor based at least on the second power utilization information.

2. The information handling system of claim 1,
wherein the embedded controller is further configured to, if the temperature of the processor is below the first threshold and if the temperature of the voltage regulator is below the second threshold, provide the first power utilization information to the at least one voltage regulator; and
wherein the at least one voltage regulator is configured to provide the first power utilization information to the at least one processor.

3. The information handling system of claim 2,
wherein the embedded controller is further configured to, if the temperature of the processor is not below the first threshold or if the temperature of the at least one voltage regulator is not below the second threshold, provide the second power utilization information to the at least one voltage regulator; and
wherein the at least one voltage regulator is configured to provide the second power utilization information to the at least one processor.

4. The information handling system of claim 1, wherein the at least one processor is configured to:
receive the first power utilization information; and
increase the current power utilization of the at least one processor based at least on the first power utilization information.

5. The information handling system of claim 1, wherein the embedded controller is further configured to:
determine that the workload utilizes another component of the information handling system; and
determine that the other component requires additional power.

6. The information handling system of claim 1, wherein the first power utilization information include an IMON offset that is less than a default IMON offset.

7. A method, comprising:
determining a utilization value of a processor of an information handling system that is being utilized for a workload;
determining that the utilization value is at or is above a threshold utilization value;
determining a temperature value of the processor;

determining a temperature value of a voltage regulator of the information handling system that provides power to the processor;

determining if the temperature value of the processor is below a first threshold value and if the temperature value of the voltage regulator is below a second threshold value;

if the temperature value of the processor is below the first threshold value and if the temperature value of the voltage regulator is below the second threshold value:
  determining first power utilization information that informs the processor that the processor is utilizing less power than the processor is currently utilizing; and
  providing the first power utilization information to the processor;

if the temperature value of the processor is not below the first threshold value or if the temperature value of the voltage regulator is not below the second threshold value:
  determining second power utilization information that informs the processor that the processor is utilizing more power than the processor is currently utilizing; and
  providing the second power utilization information to the processor;

the processor receiving the second power utilization information; and the processor decreasing the current power utilization of the processor.

8. The method of claim 7, further comprising:
if the temperature of the processor is below the first threshold and if the temperature of the voltage regulator is below the second threshold, providing the first power utilization information to the voltage regulator;
wherein the providing the first power utilization information to the processor includes the voltage regulator providing the first power utilization information to the processor.

9. The method of claim 8, further comprising:
if the temperature of the processor is not below the first threshold or if the temperature of the voltage regulator is not below the second threshold, providing the second power utilization information to the voltage regulator;
wherein the providing the second power utilization information to the processor includes the voltage regulator providing the second power utilization information to the processor.

10. The method of claim 7, further comprising:
the processor receiving the first power utilization information; and
the processor increasing the current power utilization of the processor.

11. The method of claim 7, further comprising:
determining that the workload utilizes another component of the information handling system; and
determining that the other component requires additional power.

12. The method of claim 7, wherein the first power utilization information include an IMON offset that is less than a default IMON offset.

13. An embedded controller, comprising:
at least one processor; and
a memory medium that includes instructions that, when executed by the at least one processor, cause the embedded controller to:

determine a utilization value of a processor of an information handling system that is being utilized for a workload;

determine that the utilization value is at or is above a threshold utilization value;

determine a temperature value of the processor of the information handling system;

determine a temperature value of a voltage regulator of the information handling system that provides power to the processor;

determine if the temperature value of the processor of the information handling system is below a first threshold value and if the temperature value of the voltage regulator is below a second threshold value;

if the temperature value of the processor of the information handling system is below the first threshold value and if the temperature value of the voltage regulator is below the second threshold value:
  determine first power utilization information that informs the processor of the information handling system that the processor is utilizing less power than the processor of the information handling system is currently utilizing; and
  provide the first power utilization information to the processor of the information handling system; and if the temperature value of the processor of the information handling system is not below the first threshold value or if the temperature value of the voltage regulator is not below the second threshold value:
  determine second power utilization information that informs the processor of the information handling system that the processor is utilizing more power than the processor of the information handling system is currently utilizing; and
  provide the second power utilization information to the processor of the information handling system to cause the processor of the information handling system to decrease the current power utilization of the processor of the information handling system based at least on the second power utilization information.

14. The embedded controller of claim 13, wherein, to provide the first power utilization information to the processor of the information handling system, the instructions further cause the embedded controller to provide the first power utilization information to the voltage regulator.

15. The embedded controller of claim 14, wherein, to provide the first power utilization information to the voltage regulator, the instructions further cause the embedded controller to provide the first power utilization information to a bus coupled to the embedded controller and the voltage regulator.

16. The embedded controller of claim 14, wherein, to provide the second power utilization information to the processor of the information handling system, the instructions further cause the embedded controller to provide the second power utilization information to the voltage regulator.

17. The embedded controller of claim 13, wherein, to determine the temperature value of the processor of the information handling system, the instructions further cause the embedded controller to receive the temperature value of the processor of the information handling system from the processor of the information handling system.

18. The embedded controller of claim 17, wherein, to receive the temperature value of the processor of the information handling system from the processor of the information handling system, the instructions further cause the embedded controller to receive the temperature value of the processor of the information handling system from at least one of a bus of the information handling system and a platform controller hub of the information handling system.

19. The embedded controller of claim 13, wherein, to determine the temperature value of the processor of the information handling system, the instructions further cause the embedded controller to receive the temperature value of the processor of the information handling system, determined by at least on-die digital thermal sensor of the processor of the information handling system, from the processor of the information handling system via a bus.

* * * * *